United States Patent [19]

Speth et al.

[11] Patent Number: 4,569,553
[45] Date of Patent: Feb. 11, 1986

[54] SLIDING DOOR TRACK GUIDING MECHANISM

[75] Inventors: Adolph P. Speth, Orchard Lake; David L. Anderson, Royal Oak; Charles W. Clayton, Lake Orion, all of Mich.

[73] Assignee: Chrysler Corporation, Highland Park, Mich.

[21] Appl. No.: 665,599

[22] Filed: Oct. 29, 1984

[51] Int. Cl.⁴ .............................................. B60J 5/06
[52] U.S. Cl. ..................................... 296/155; 49/213
[58] Field of Search ................ 296/155; 49/213–215, 49/225

[56] References Cited

U.S. PATENT DOCUMENTS

| | | | |
|---|---|---|---|
| 3,100,667 | 8/1963 | Schwenk | 49/214 |
| 4,110,934 | 9/1978 | Zens | 296/155 |
| 4,152,872 | 5/1979 | Tanizaki | 296/155 |
| 4,157,846 | 6/1979 | Whitcroft | 296/155 |
| 4,502,246 | 3/1985 | Minami | 49/213 |

FOREIGN PATENT DOCUMENTS 1503901 3/1978 United Kingdom .
1036579 8/1983 U.S.S.R. .

*Primary Examiner*—Robert R. Song
*Attorney, Agent, or Firm*—Edward P. Barthel

[57] ABSTRACT

An upper track roller mechanism for a vehicle sliding door. The upper track lies in a plane canted upward at an acute angle defined by the door opening upper sill panel. A roller support guide link is hinged on the door adjacent its upper forward corner for vertical movement about a horizontally disposed longitudinally extending axis. The guide link has an arm portion with a track roller pivot pin adjacent its free end such that the axis of the pin is substantially perpendicular to the arm. The roller is operative with the track configuration to pivot the guide link to an upwardly inclined door closed position wherein the link profile is contoured to the vehicle door opening upper body sill trim panel.

3 Claims, 5 Drawing Figures

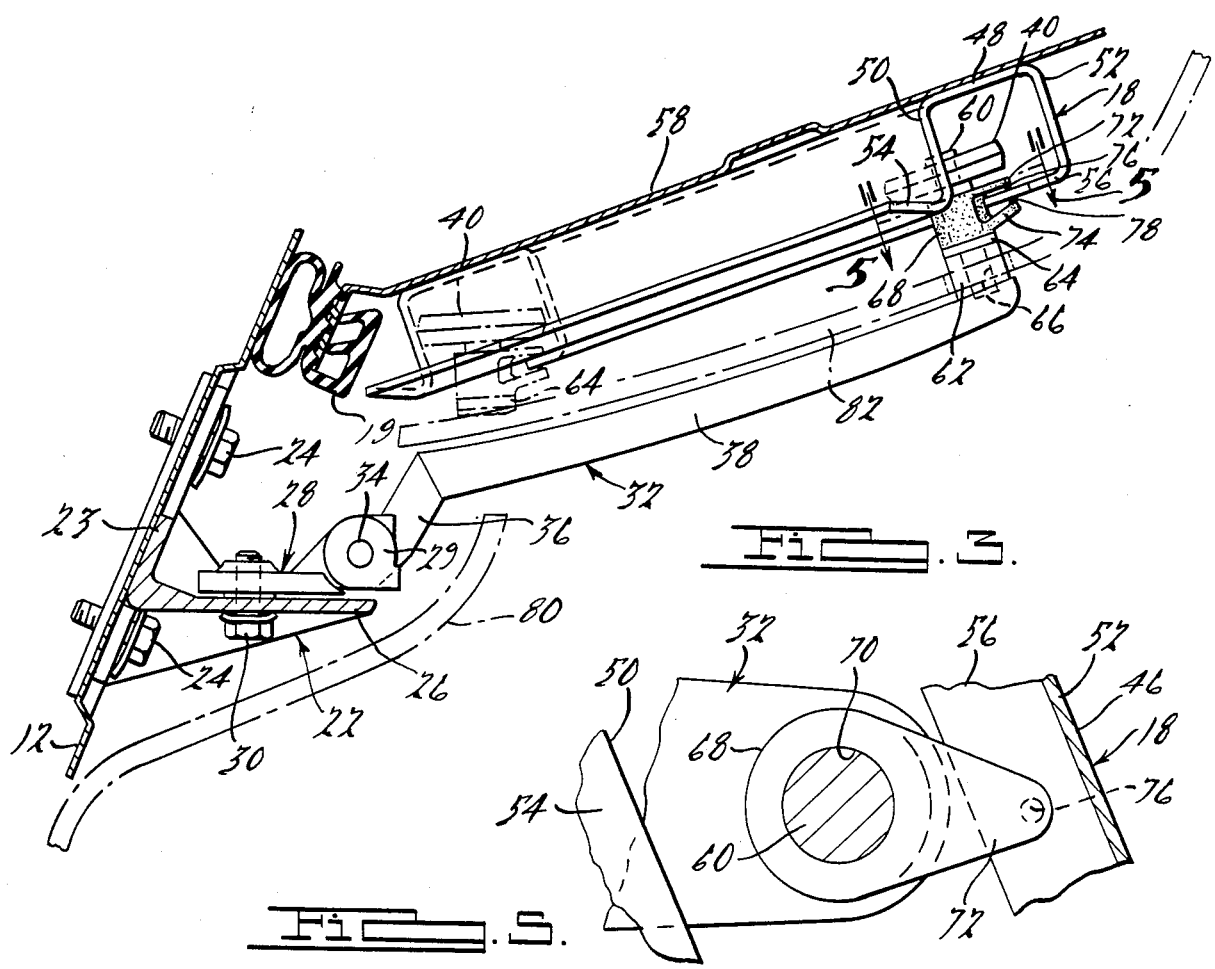
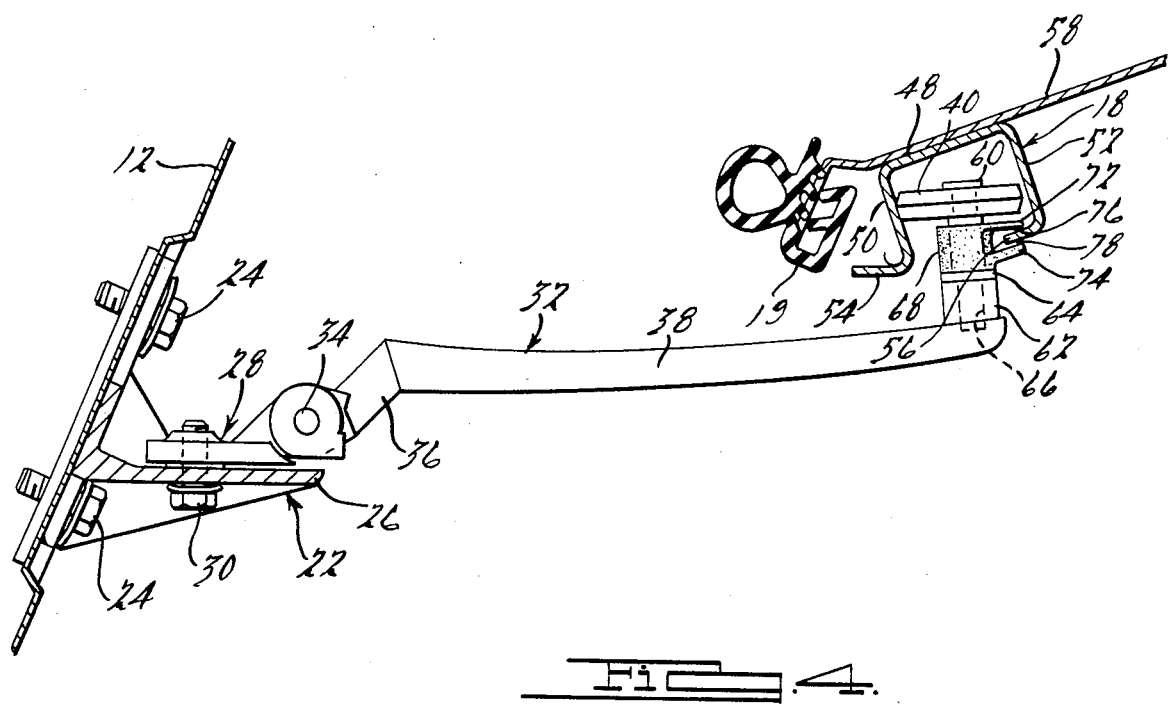

4,569,553

SLIDING DOOR TRACK GUIDING MECHANISM

BACKGROUND OF THE INVENTION

This invention relates in general to sliding door installation for a motor vehicle and more particularly to an upper track roller mechanism for the door.

Track roller mechanisms for a vehicle sliding door having inwardly curved roller guiding tracks are well known in the art. The U.S. Pat. No. 4,152,872 issued May 8, 1979 to Tanizaki et al. discloses a panel-type truck having a typical sliding door mechanism. When the Tanizaki door is being moved from its open to its closed position the tracks, which are inwardly-curved at their forward ends, bring the front edge of the door into closed engagement with the vehicle body. A pivotally mounted bracket allows the rear end of the door to be swung inwardly to latch the door in a position flush with the vehicle side. Tanizaki also discloses an upper track mechanism with a horizontally disposed guide roller slidable in a U-section track.

SUMMARY OF THE INVENTION

The present invention provides an upper track roller sliding mechanism for a vehicle sliding door wherein the leading upper edge of the door is guided by a roller mounted on a vertically pivoting support link. The upper guide track base wall is mounted flush with an overhead sill panel on the vehicle body. The sill panel extends at an upwardly sloped angle from the door opening upper edge. The guide track has a longitudinally extending main section, an intermediate curved section and a forward oblique section. The main track section is substantially coextensive with the door opening upper edge with the terminal oblique section extending upwardly and forwardly from the curved section. The roller support link is hinged to a bracket connected adjacent the upper leading edge of the door for pivotal movement about a longitudinally extending horizontally disposed hinge pin axis. The support link has an arm portion supporting a track roller with its axis of rotation aligned substantially perpendicular to the arm portion. By virtue of this arrangement the arm portion travels in a substantially horizontal plane as the roller moves along the main track section. Upon the roller traveling through the track curved section and into the track oblique section during closure of the door, the support link pivots upwardly about its horizontal hinge pin axis. With the door closed the arm portion is oriented at an upwardly inclined position substantially parallel with the sloped sill panel.

It is thus a feature of the present invention to provide an upper track mechanism for a vehicle sliding door wherein the upper track roller support link is pivoted upwardly as the door leading edge is brought into flush engagement with the vehicle body providing a compact support link profile contoured to the vehicle door opening upper body sill trim panel.

It is another feature of the present invention to provide a mechanism as set forth above with track roller pivot pin having a bushing formed with plastic follower tabs which maintain the pivoting support link in close horizontal tracking contact with a track flange to ensure noise-free easy operation throughout travel of the door while eliminating binding engagement between the parts.

Further objects and advantages of the present invention will be more readily apparent from the following detailed description, reference being had to the accompanying drawings, in which a preferred embodiment is illustrated.

IN THE DRAWINGS

FIG. 3 is a fragmentary vertical elevational view of the door in its closed position taken along line 3—3 in FIG. 1 and looking in the direction of the arrows;

FIG. 4 is a fragmentary vertical sectional view taken along section line 4—4 in FIG. 2 and looking in the direction of the arrows; and FIG. 5 is an enlarged fragmentary sectional view of the roller and its stem filler portion taken on section line 5—5 in FIG. 3.

DESCRIPTION OF THE PREFERRED EMBODIMENT

Figure 1:
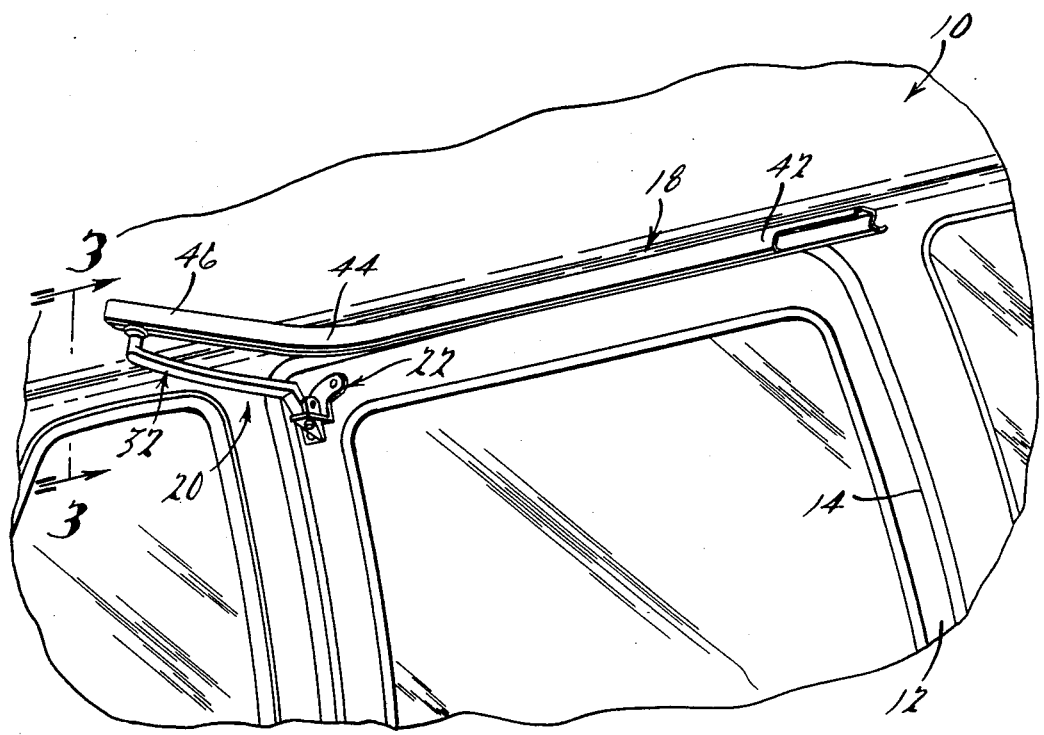
FIG. 1 is a fragmentary perspective interior view of a vehicle sliding door in a closed operational position showing the upper track sliding mechanism.

Referring to the drawings and in particular to FIG. 1 there is shown a fragmentary perspective view of a portion of a vehicle body 10 showing the interior upper portion of a sliding side door 12. The door 12 is received in a rectangular opening 14 formed in the vehicle side wall or panel 16. The door 12 is constructed to slidably move from the FIG. 1 closed position flush with the body side wall 16 to the FIG. 2 open position. As indicated in dashed lines in FIG. 2 the open door leading edge 17 is located adjacent the opening rear edge.

The door 12 slides by rollers suitably mounted thereon at upper and a lower positions in corresponding tracks on the body of the vehicle. In FIGS. 1-4 of the disclosure only an upper track member 18 is shown which is suitably secured above the door opening upper edge 19. It is understood that applicants' novel upper track sliding mechanism, generally indicated at 20, could be used with various sliding door track arrangements without departing from the invention. An example of one such track arrangement is shown in U.S. Pat. No. 3,100,667 issued Aug. 13, 1963 to S. Schwenk, the disclosure of which is incorporated by reference herein.

The upper track guiding mechanism 20 comprises an angle bracket 22 having an angled flange 23 suitably secured to the sliding door 12 adjacent to its upper leading edge corner such as by bolts 24. The bracket 22 has an inwardly extending horizontal flange 26 which supports a single-leaf hinge plate 28 on its upper surface by means of bolts such as shown at 30. The plate 28 has a pair of spaced ears 29 hinged to a central hinged ear of a roller support link 32 by means of a pin 34 aligned on a longitudinally extending horizontally disposed axis.

The support link 32 is a die cast member having a generally dog-leg shape when viewed in profile. The link comprises an upwardly and inwardly inclined shoulder portion 36 and an inwardly extending arm portion 38. The arm portion 38 has a track roller 40 mounted on its free end and is adapted to be received in and rotatable on the upper track member 18. The roller 40 is freely rotatable about the axis of a shaft or pin to be described.

Figure 2:
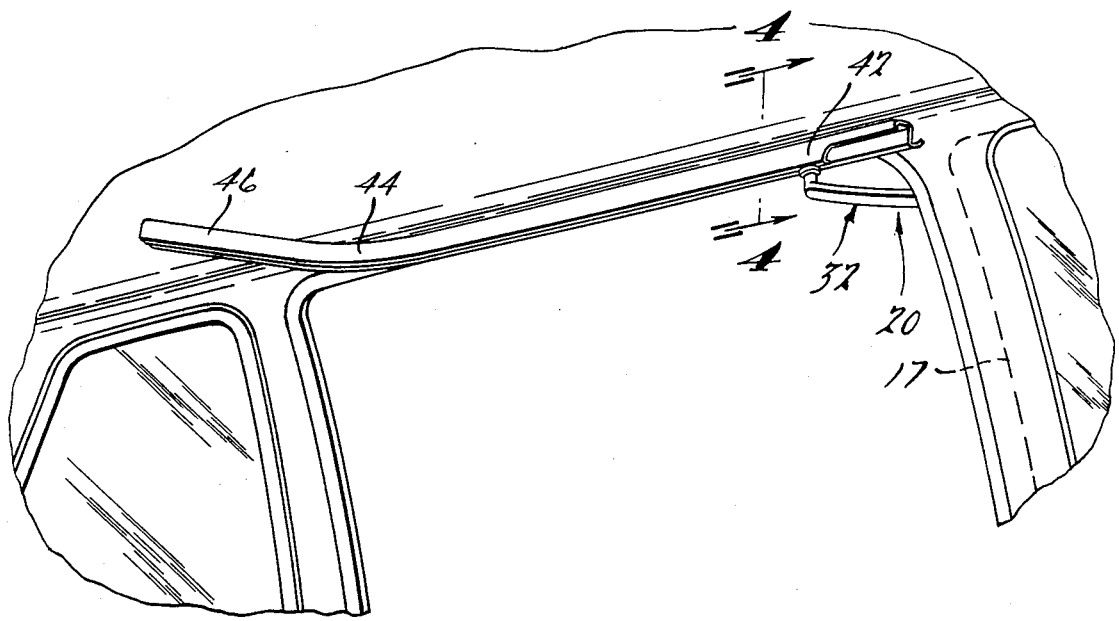
FIG. 2 is a view similar to FIG. 1 but with the vehicle sliding door in an open operational position.

As seen in FIGS. 1 and 2 the track member 18 includes a longitudinally extending main linear section 42, an intermediate curved section 44, and a forwardly and inwardly extending oblique section 46. The track member 18 is shown in FIG. 3 having a generally U-shaped cross-section including a base wall 48 and a pair of parallel side walls 50 and 52 extending normally therefrom. The outboard side wall 50 terminates in an outwardly directed horizontally disposed flange 54 oriented at an acute angle of about 65 degrees from its side wall 50. The inboard side wall 52 terminates in an outwardly directed guide flange 56 oriented at a right angle to its side wall 52.

FIG. 3 shows the track member 18 having its base wall 48 suitably secured as by threaded fasteners (not shown) to door opening upper sill panel 58. The sill panel 58 is oriented at an acute angle of about 30 degrees from the horizontal. It will be noted in FIGS. 2 and 4 that with the door 12 slid rearwardly to its open dashed-line 17 position the arm portion 38 is oriented in a substantially horizontal plane. In the FIG. 4 door open position the roller 40 is disposed horizontally by means of a pivot shaft member 60 having its principal axis extending upwardly at substantially ninety degrees or normal to the arm portion.

The support link 32 inner free end terminates in a cylindrical hub portion 62 preferably cast integral with the arm portion 38. The roller 40 is rotatably mounted on the shaft member 60 upper end. The shaft has an integrally formed annular collar 64 intermediate its ends which collar seats on the upper surface of said hub portion. The shaft member lower end has a splined or knurled surface for a press-fit insertion in hub axial blind bore 66 preventing rotation of the shaft relative to the arm portion. As seen in FIG. 5, a cylindrical follower bushing member 68, moulded from a suitable plastic material, has a central bore 70 insertable over the shaft member 60 and fixably molded thereto as a subassembly.

The bushing member 68 has a pair of spaced upper and lower integral plastic follower tabs, 72 and 74 respectively, extending inwardly therefrom. The upper tab 72 is spaced from the underside of the roller 40 and lies in a plane normal to the axis of the shaft member 60. The lower tab 74 is inclined upwardly at an acute angle of about 75 degrees with respect to the axis of shaft 60. As seen in FIG. 4, the lower tab 74 is oriented substantially parallel to the guide flange 56 during travel of the roller along the main section 42 of the track.

With reference to FIG. 3 upon the roller 40 passing through the curved track section 44 and entering the oblique track section 46 the support link 32 is pivoted upwardly about the axis of the hinge pin 34. With the door 12 moved to its fully closed forward position of FIG. 3 it is drawn inwardly to its latched position flush with the vehicle body right side wall 16. In this closed mode the support link arm portion 38 is upwardly inclined so as to be oriented substantially parallel with the plane of the sill member 58.

It will be noted in FIG. 3 that in the door closed position, the upper follower bushing upper tab 72 is oriented substantially parallel to the upper surface of the guide flange 56. In the FIG. 4 door open position, the lower tab 74 is oriented substantially parallel to the lower surface of the guide flange 56. The arrangement of the follower tabs 72 and 74 allows them to remain juxtaposed to the flange 56 without binding contact as the roller 40 changes orientation from a substantially horizontal open position to its closed inclined position.

Further, a raised boss 76, 78 is preferably moulded on the inner surface of each of the tabs 72 and 74, respectively, ensuring close running contact with their associated guide flange surface during travel of the door. The plastic tabs 72 and 74 closely track the guide flange 56 to maintain vertical control of the roller 40 relative to the track wall 50 in a noise free manner. Thus, throughout the travel of the door, the roller 40 is maintained in positive load bearing contact with the track side wall 50 as the roller moves from its generally horizontal orientation of FIG. 4 to its inclined orientation of FIG. 3. Additionally, binding engagement between the parts is eliminated.

The invention results in a smooth, quiet sliding door upper track roller mechanism which provides a conforming profile with the body interior upon closure of the door. It will be seen in FIG. 3 that applicants' hinged roller supporting link 32 profile substantially conforms with the contour of body interior wall and sill trim panels indicated in dashed lines at 80 and 82, respectively.

The embodiment of the invention in which an exclusive property or privilege is claimed are defined as follows:

What is claimed is:

1. In a motor vehicle, an upper track roller mechanism for a sliding door which is movable forwardly and rearwardly along a wall of the vehicle to selectively close and open a generally rectangular opening in said wall, said opening defined by forward and rear vertical side edges joined by upper and lower horizontal edges, said upper track roller mechanism comprising; an upper guide track having a substantially inverted U-shaped cross-section, said track including a main section, an intermediate curved section, and a forward section, said track sections supported on an upper door opening sill panel oriented in a longitudinally extending common plane inclined upwardly from said opening upper edge at a predetermined acute angle from the horizontal, said main section extending along said opening upper edge with said intermediate curved section adjacent said opening forward edge such that said forward section extends obliquely from said curved section, a support link hinged to said door adjacent its forward upper corner for pivotal movement about a longitudinally extending horizontally disposed hinge axis relative to said vehicle, said link having a track roller adjacent its free end such that said roller is received in said track for reciprocal travel therein, the arrangement such that during travel of said roller in said track main section said roller is oriented in a substantially horizontal plane, and wherein upon said roller moving through said curved section and into said forward section during closure of said door, said link being pivoted upwardly about said hinge axis to an inclined position wherein said link and said roller being oriented in a plane substantially parallel with the inclined plane of said sill panel in the door closed position.

2. The track roller mechanism as defined in claim 1, wherein said roller being rotatively supported on the free end of a shaft with said shaft principal axis aligned substantially normal to said link, a bushing member moulded from plastic material received on said shaft, said bushing member formed with a pair of upper and lower spaced follower tabs, said U-shaped track having a guide flange coextensive therewith oriented in a plane substantially parallel with said sill panel whereby said guide flange being received between said tabs to vertically position said link throughout its travel.

3. In a vehicle, an upper track roller guide mechanism for a sliding door movable forwardly and rearwardly along a side wall of the vehicle to selectively close and open a generally rectangular opening in said wall, said opening defined by forward and rear vertical side edges joined by upper and lower horizontal edges, said upper track roller guide mechanism comprising; an upper guide track having a substantially inverted U-shaped cross-section, said track including a main section, an intermediate curved section, and a forward section, said track sections oriented in a longitudinally extending common plane inclined upwardly from said opening upper edge at a predetermined acute angle from the horizontal, said main section extending along said opening upper edge with said intermediate curved section located adjacent said opening forward edge, such that said forward section extends inwardly and forwardly in an oblique manner from said curved section, a roller support link having a dog-leg shape in profile defining an upwardly extending shoulder portion and an inwardly extending arm portion, said shoulder portion hinged to said door inner surface adjacent its forward upper corner by a bracket for pivotal movement about a longitudinally extending horizontally disposed hinge pin, said arm portion integrally formed with an upwardly extending cylindrical hub portion on its inner free end, said hub portion having an axial bore fixedly receiving one end of a roller support shaft, said shaft rotatably supporting said roller on its free end with the shaft principal axis aligned substantially normal to said arm portion, said shaft having an integrally formed collar located intermediate its free ends which seats on the upper surface of said hub portion, a cylindrical bushing member moulded from plastic material having a central bore fixedly received on said shaft intermediate said roller and said collar, said bushing member formed with a pair of upper and lower spaced follower tabs extending inwardly therefrom, said inverted U-shaped track including a base wall and a pair of parallel inboard and outboard side walls extending normally therefrom, said inboard side wall terminating in an outwardly directed right angled guide flange coextensive therewith, said tabs receiving said guide flange therebetween with said roller received in said U-shaped track for reciprocal travel therein, the arrangement such that during travel of said roller in said main track section said roller is oriented in a substantially horizontal manner, and wherein upon said roller moving through said curved section and into said forward section during closure of said door, said link being pivoted upwardly about said hinge pin to an inclined position with said roller and said hub arm portion oriented substantially parallel with the plane of said track section in the door closed position.

* * * * *